(12) United States Patent
Hilmer

(10) Patent No.: US 8,859,692 B2
(45) Date of Patent: Oct. 14, 2014

(54) PROCESS FOR REACTING THERMOPLASTIC POLYURETHANES WITH COMPOUNDS HAVING ISOCYANATE GROUPS

(75) Inventor: Klaus Hilmer, Brockum (DE)

(73) Assignee: BASF SE, Ludwigshafen (DE)

( * ) Notice: Subject to any disclaimer, the term of this patent is extended or adjusted under 35 U.S.C. 154(b) by 902 days.

(21) Appl. No.: 12/530,373

(22) PCT Filed: Mar. 19, 2008

(86) PCT No.: PCT/EP2008/053261
§ 371 (c)(1),
(2), (4) Date: Sep. 8, 2009

(87) PCT Pub. No.: WO2008/116801
PCT Pub. Date: Oct. 2, 2008

(65) Prior Publication Data
US 2010/0105842 A1    Apr. 29, 2010

(30) Foreign Application Priority Data
Mar. 27, 2007 (EP) .................................. 07105042

(51) Int. Cl.
C08G 18/82 (2006.01)
C08L 75/06 (2006.01)
C08G 18/10 (2006.01)
C08G 18/42 (2006.01)

(52) U.S. Cl.
USPC ........................................................ 525/457

(58) Field of Classification Search
USPC ................... 525/457, 458, 460; 428/423.5
See application file for complete search history.

(56) References Cited

U.S. PATENT DOCUMENTS

| 3,494,894 A | 2/1970 | Urgesi |
| 4,261,946 A | 4/1981 | Goyert et al. |
| 4,347,338 A | 8/1982 | Torii et al. |
| 6,142,189 A | 11/2000 | Bhattacharyya |
| 7,858,712 B2 * | 12/2010 | Hilmer et al. ................. 525/457 |
| 2004/0092696 A1 | 5/2004 | Vedula et al. |
| 2007/0112143 A1 * | 5/2007 | Hilmer et al. ................. 525/457 |
| 2007/0179255 A1 | 8/2007 | Vedula et al. |

FOREIGN PATENT DOCUMENTS

| DE | 41 15 508 | 11/1992 |
| DE | 44 12 329 | 10/1995 |
| EP | 0 922 719 | 6/1999 |
| EP | 1 158 011 | 11/2001 |
| EP | 1 692 203 | 8/2006 |
| GB | 1 163 649 | 9/1969 |
| GB | 2 347 933 | 9/2000 |
| WO | 03 014179 | 2/2003 |
| WO | 2005 023529 | 3/2005 |
| WO | 2005 053938 | 6/2005 |

* cited by examiner

Primary Examiner — Rabon Sergent
(74) Attorney, Agent, or Firm — Oblon, Spivak, McClelland, Maier & Neustadt, L.L.P.

(57) ABSTRACT

Process for reacting thermoplastic polyurethanes with compounds having isocyanate groups, wherein the reaction is carried out in the presence of a prepolymer which is the reaction product of (a) isocyanates with (b) compounds which are reactive toward isocyanates and have a molecular weight in the range from 500 g/mol to 10 000 g/mol, preferably from 2000 g/mol to 8000 g/mol, and the prepolymer has a glass transition temperature Tg measured by means of DSC in accordance with DIN EN ISO 11357-1 below −35° C.

17 Claims, No Drawings

PROCESS FOR REACTING THERMOPLASTIC POLYURETHANES WITH COMPOUNDS HAVING ISOCYANATE GROUPS

The invention relates to a process for, preferably, producing crosslinked polyurethanes having a Shore A hardness of from 55 to 85, preferably from 60 to 80, by reacting thermoplastic polyurethanes, preferably having a Shore A hardness of from 55 to 85, with compounds having isocyanate groups, wherein the reaction is carried out in the presence of a prepolymer which is the reaction product of (a) isocyanates with (b) compounds which are reactive toward isocyanates and have a molecular weight in the range from 500 g/mol to 10 000 g/mol, preferably from 2000 g/mol to 8000 g/mol, and the prepolymer has a glass transition temperature Tg measured by means of DSC in accordance with DIN EN ISO 11357-1 below −35° C. Furthermore, the invention relates to polyisocyanate polyaddition products, in particular fibers, tubes, cable sheathing, profiles, moldings and films, which can be obtained by the process of the invention.

The production of thermoplastic polyurethanes, hereinafter also referred to as TPUs for short, is generally known.

TPUs are partially crystalline materials and belong to the class of thermoplastic elastomers. A characteristic of polyurethane elastomers is the segmented structure of the macromolecules. Owing to the differing cohesion energy densities of these segments, phase separation into crystalline "hard" and amorphous "soft" regions occurs in the ideal case. The resulting two-phase structure determines the property profile of TPU.

To improve the property profile of TPU, it is known from the literature that crosslinks can be introduced into the TPU so as to lead to an increase in strength, an improvement in the heat distortion resistance, a reduction in tensile set and compression set, an improvement in resistances to media of all types, resilience and creep behavior.

Known crosslinking methods are, inter alia, UV or electron beam crosslinking, crosslinking via siloxane groups and the formation of crosslinks by addition of isocyanates to the molten TPU. The reaction of a TPU, preferably in the molten state, with compounds having isocyanate groups is referred to as prepolymer crosslinking and is known in general terms from U.S. Pat. Nos. 4,261,946, 4,347,338, DE-A 41 15 508, DE-A 44 12 329, EP-A 922 719, GB 2,347,933, U.S. Pat. No. 6,142,189, EP-A 1 158 011, EP-A 1 692 203 and WO 2005/053938. Here, crosslinking leads to an increase in hardness of the product, which is undesirable precisely for uses as substitute for rubber. This increase in hardness can be compensated to only a limited extent by the use of softer TPU grades, since the very soft TPU grades which are necessary have very poor crystallization behavior and can barely be processed.

It was therefore an object of the present invention to develop a process for producing a crosslinked, originally thermoplastic polyurethane which has a low hardness and also has very good solidification behavior and good strength. The product which can be obtained should be able to be used as rubber substitute and have the usual high strengths of TPU combined with a low compression set and a higher use temperature.

This object has been able to be achieved by the process presented at the outset. The present invention additionally provides polyisocyanate polyaddition products, in particular crosslinked polyurethane having a Shore A hardness in the range from 60 to 80, which can be obtained by the process of the invention.

The process of the invention and the products obtainable thereby are distinguished by the fact that the prepolymer introduced, which in its preferred form has isocyanate groups and thus can serve directly for crosslinking, has a high soft phase content and can therefore compensate for the increase in hardness caused by crosslinking. This makes it possible to obtain soft products which would not be able to be handled without crosslinking from thermoplastic polyurethane. As a result of the crosslinks, the typical thermoplastic behavior is significantly altered and the use temperatures are significantly higher (up to 180° C., depending on the degree of crosslinking). The low compression set and the high mechanical strengths typical of TPUs expand the range of possible uses tremendously.

The glass transition temperature Tg according to the invention of the prepolymer is achieved by use of the polyols having a molecular weight in the range from 500 g/mol to 5000 g/mol in the preparation of the prepolymer. As a result of the use of these high molecular weight polyols, the prepolymers have a high content of soft phase and due to the preferred formation using branched diols the crystallization tendency of the prepolymer is correspondingly reduced.

The prepolymer used can, in a preferred embodiment, have free isocyanate groups and thus serve directly for crosslinking. However, it is also possible for the prepolymer used according to the invention to have groups which are reactive toward isocyanates and is reacted together with isocyanates with the TPU. According to the invention, the prepolymer can thus preferably have hydroxyl groups, and in a particularly preferred embodiment the prepolymer has isocyanate groups; in particular, the prepolymer has an NCO content of from 1.5 to 6%. If the prepolymer used according to the invention has isocyanate groups, the prepolymer is, for the purposes of the present text and the explanations below, to be regarded as compound having isocyanate groups with which the TPU is reacted.

The preparation of the prepolymer used according to the invention can be carried out by generally known methods, with the reaction particularly preferably being carried out using an excess of isocyanate so that the prepolymer has free isocyanate groups. The reaction can be carried out in customary apparatuses, for example stirred vessels, at temperatures of from 40 to 80° C.

As isocyanates (a) for preparing the prepolymer, it is possible to use generally known isocyanates, e.g. aliphatic, cycloaliphatic, araliphatic and/or aromatic isocyanates, preferably diisocyanates, for example trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethylbiphenyl diisocyanate, 1,2-diphenylethane diisocyanate and/or phenylene diisocyanate.

As compounds (b) which are reactive toward isocyanates and have a molecular weight in the range from 500 g/mol to 10 000 g/mol, preferably from 500 g/mol to 8000 g/mol, it is possible to use generally known polyesterols, polyetherols and/or polycarbonate diols, which are usually summarized under the term "polyols", preferably having a mean functionality of from 1.8 to 2.5, preferably from 1.9 to 2.2, in particular 2, for preparing the prepolymer used according to the invention. The prepolymer is preferably based on polyester diols as compounds (b) which are reactive toward isocyanates and have a molecular weight in the range from 500 to 8000 g/mol.

The polyester diols for preparing the prepolymer can be based on dicarboxylic acids having from 2 to 12 carbon atoms, preferably from 4 to 8 carbon atoms, which are generally known for the preparation of polyester diols and polyhydric alcohols. Examples of polyhydric alcohols are alkanediols having from 2 to 10, preferably from 2 to 6, carbon atoms, e.g. ethanediol, 1,3-propanediol, 1,4-butanediol, 1,5-pentanediol, 1,6-hexanediol, 1,10-decanediol, 2,2-dimethyl-1,3-propanediol, 1,2-propanediol and dialkylene ether glycols such as diethylene glycol and dipropylene glycol. Depending on the desired properties, the polyhydric alcohols can be used either alone or, if appropriate, in mixtures with one another. To keep the glass transition temperature Tg of the prepolymer very low, it can be advantageous to use a polyester diol based on branched diols, particularly preferably based on 3-methyl-1,5-pentanediol, for preparing the prepolymer. The polyester diol is particularly preferably based on at least two different diols; in particular, use will be made of polyester diols based on different diols, i.e. polyester diols which are prepared by condensation of dicarboxylic acids with a mixture of at least two different diols.

Possible dicarboxylic acids are, for example: aliphatic dicarboxylic acids such as succinic acid, glutaric acid, suberic acid, azelaic acid, sebacic acid and preferably adipic acid and aromatic dicarboxylic acids such as phthalic acid, isophthalic acid and terephthalic acid. The dicarboxylic acids can be used individually or as mixtures, e.g. in the form of a mixture of succinic acid, glutaric acid and adipic acid. Mixtures of aromatic and aliphatic dicarboxylic acids can likewise be used. To prepare the polyesterols, it may be advantageous to use the corresponding dicarboxylic acid derivatives such as dicarboxylic esters having from 1 to 4 carbon atoms in the alcohol radical, dicarboxylic anhydrides or dicarboxylic acid chlorides in place of the dicarboxylic acids. The polyester diol is particularly preferably based on adipic acid.

In the process of the invention, mixtures of prepolymers can preferably be used. The thermoplastic polyurethane is particularly preferably reacted with a mixture of compounds having isocyanate groups, with the mixture preferably having an isocyanate functionality in the range from 2.1 to 3. The mixture of the compounds having isocyanate groups preferably has an NCO content in the range from 4 to 17%.

Particular preference is given to using from 5 to 20 parts by weight of prepolymer having isocyanate groups and a glass transition temperature Tg measured by means of DSC in accordance with DIN EN ISO 11357-1 below −35° C. which is the reaction product of (a) isocyanates and (b) compounds which are reactive toward isocyanates and have a molecular weight in the range from 500 g/mol to 8000 g/mol, from 1 to 10 parts by weight of prepolymer having isocyanate groups which is the reaction product of (a) diisocyanates and (c) diols having a molecular weight in the range from 62 g/mol to 499 g/mol, from 1 to 15 parts by weight of trifunctional prepolymer having isocyanate groups, i.e. prepolymer having three isocyanate groups per molecule, which is the reaction product of (a) triisocyanates and diols, per 100 parts by weight of thermoplastic polyurethane.

This particularly preferred mixture comprising the prepolymer used according to the invention offers the advantage that good heat distortion resistance and a low compression set are achieved at a small increase in hardness and good solidification behavior.

As a result of the reaction of the TPU with the compounds having isocyanate groups, preferably the prepolymer used according to the invention, these isocyanate groups form crosslinks in the form of, for example, urethane, allophanate, uretdione and/or isocyanurate structures and also possibly urea and biuret bonds during and/or after mixing of the components in a cold or hot state. The formation of the crosslinks can, if appropriate, be promoted by addition of catalysts which are generally known for this purpose, for example alkali metal acetates and/or formates. In addition, crosslinking occurs via free groups which are reactive toward isocyanates, e.g. hydroxyl groups or primary or secondary amino groups, in particular hydroxyl groups, of the linear TPU polymer. These reactive groups can be present in the TPU pellets but are also formed in the TPU melt in the extruder, e.g. as a result of thermodynamic cleavage of the polymer chain under processing conditions, or else during storage or heating of the isocyanate-rich material.

The reaction of the TPU with the compounds having isocyanate groups, preferably the prepolymers according to the invention having isocyanate groups, can be carried out by generally known methods under conditions customary for this purpose. Preference is given to melting the preferably pelletized thermoplastic polyurethane in an extruder and mixing and reacting it in the molten state with the prepolymer and, if appropriate, compounds having isocyanate groups. The prepolymer used according to the invention is particularly preferably covalently bound to the TPU as a result of the reaction with the TPU.

Preference is given to feeding pelletized thermoplastic polyurethane via a feeding aid, i.e. a feeder zone which effects transport, into an extruder, e.g. twin-screw extruder, or an injection molding apparatus, preferably an extruder, and mixing it with compounds having isocyanate groups in the extruder or the injection molding apparatus, preferably in the extruder, and preferably reacting it in the extruder. Processing in injection molding apparatuses is also preferred. In this case, the prepolymer can preferably be metered into the injection molding apparatus after melt processing and reacted there.

The thermoplastic polyurethane is thus preferably processed with the compounds having isocyanate groups by means of injection molding, in particular mixed and injected into a mold. In multicomponent injection molding, preferably two-component injection molding, the thermoplastic polyurethane together with the compounds having isocyanate groups is preferably injected onto a plastic. The plastic onto which the thermoplastic polyurethane in admixture with the compounds having isocyanate groups is injected is preferably polyamide. Preference is given to the polyamide being reinforced with glass fibers.

The preferred use of a feeding aid via which the TPU and preferably also the compounds having isocyanate groups are fed to the extruder and which is located on the extruder or on the injection molding apparatus enables the solid TPU pellets to be quickly and reliably introduced either together with or separately from, preferably together with, the compounds having isocyanate groups which are preferably liquid or viscous, preferably liquid, at 15° C. into the extruder or the injection molding apparatus. Since the pressure of the melt usually increases over the length of the extruder, the compounds having isocyanate groups will preferably be introduced into the extruder at a point at which the pressure of the melt is less than 200 bar. The compounds having isocyanate groups will particularly preferably be introduced together with thermoplastic polyurethanes via the feeding aid into the extruder or the injection molding apparatus, i.e. the same feeding aid is used for the TPU and the compounds having isocyanate groups.

The extruder can be a generally known extruder as is generally known, for example, for extrusion of TPU, e.g. a single- or preferably twin-screw extruder, particularly preferably a single-screw extruder with feeding aid, in particular grooved feeding aid. Moreover, the particularly preferred embodiments according to the present invention lead to particularly effective and economical mixing and reaction of TPU and compounds having isocyanate groups.

Feeding aids for extruders are generally known to those skilled in the art of extrusion and have been described many times. The feeding aid is preferably a grooved feed zone. Grooved feeding aids, grooved barrel extruders or extruders having a grooved feed zone are generally known to those skilled in the art of extrusion and have been described many times, e.g. in "Der Extruder im Extrusionsprozess—Grundlage für Qualität and Wirtschaftlichkeit", VDI-Verlag GmbH, Düsseldorf, 1989, ISBN 3-18-234141-3, pages 13 to 27. A characteristic of a grooved feed zone is the presence of longitudinal grooves in the barrel wall, usually essentially parallel to the longitudinal extension of the screw in the feed zone of the extruder, which viewed in the transport direction usually taper conically to the end of the feed zone. According to the invention, these grooves lead, despite the introduction of a liquid component into the extruder, to significantly improved axial transport of TPU and compounds having isocyanate groups by the screw in the extruder.

The grooves preferably have a depth which is in the range from 10% to 90% of the mean particle diameter of the TPU, i.e. the depth of the grooves is significantly smaller than the mean particle diameter of the pelletized TPU. The grooves particularly preferably have a depth in the range from 1 mm to 8 mm, preferably from 2 mm to 5 mm. The grooved feed zone preferably has a length in the range from 2 times to 4 times the screw diameter. The grooved feed zone preferably has from 4 to 32, particularly preferably from 4 to 16, grooves which preferably run parallel or helically, preferably parallel, to the longitudinal axis of the extruder.

As screws, it is possible to use generally known screws, e.g. 3- or 5-zone screws. Particular advantages are obtained in the present process when an extruder having a barrier screw is used. Barrier screws are generally known in extrusion, e.g. from "Der Extruder im Extrusionsprozess—Grundlage für Qualität and Wirtschaftlichkeit", VDI-Verlag GmbH, Düsseldorf, 1989, ISBN 3-18-234141-3, pages 107 to 125, pages 139 to 143. Unexpectedly and surprisingly for a person skilled in the art, barrier screws lead, in the case of the preferred solid-liquid introduction, in particular during mixing and reaction of TPU and compounds having isocyanate groups, to particular advantages, namely that the liquid components quickly go over the barrier flight into the melt bed of this screw and are not themselves damaged thermally thereby and do not influence the melting of the pellets. The reaction rate therefore decreases slowly, preferably from a very high isocyanate content, since melt continuously flows over the barrier. As a result, the process can be controlled particularly well.

The temperature of the melt in the extruder or in the injection molding apparatus, preferably the extruder, is usually in the range from 150° C. to 240° C., preferably from 180° C. to 230° C.

The residence time of the TPU in the extruder is preferably in the range from 120 s to 600 s.

The process product according to the invention can be processed by generally known methods to give moldings of all types, films, tubes, cable sheathing, injection-molded articles or fibers. The processing temperature in the production of the films, moldings or fibers is preferably from 150 to 230° C., particularly preferably from 180 to 220° C. Processing of the mixture to give the desired films, moldings and/or fibers is preferably carried out immediately after or during mixing of the components, since thermoplastic processing of the polyisocyanate polyaddition products to give films, moldings or fibers is preferably carried out before and/or during the formation of the crosslinks.

Subsequent heat treatment/storage of the process products from extrusion, injection molding or melt spinning, for example the moldings, films or fibers, at a temperature of, for example, from 120 to 80° C. for a time of usually at least 2 hours, preferably from 12 to 48 hours (everything proceeds correspondingly more slowly at room temperature), allophanate, uretdione and/or isocyanurate crosslinks can be formed in the polyisocyanate polyaddition products by the isocyanate groups present in excess.

These crosslinks lead to very advantageous properties of the products in respect of thermal stability and the hysteresis behavior after loading.

As TPUs, it is possible to use generally known TPUs. The thermoplastic polyurethane preferably has a Shore A hardness in the range from 55 to 85, particularly preferably from 60 to 80. The TPUs can be used in the process of the invention in customary form, for example as pellets or polymer particles, preferably pellets. TPUs are generally known and have been described many times.

Processes for producing TPUs are generally known. For example, the thermoplastic polyurethanes can be produced by reacting (a) isocyanates with (b) compounds which are reactive toward isocyanates and have a molecular weight of from 500 to 10 000 and, if appropriate, (c) chain extenders having a molecular weight of from 50 to 499, if appropriate in the presence of (d) catalysts and/or (e) customary auxiliaries and/or additives. The starting components and processes for producing the preferred TPUs are presented by way of example below. The components (a), (b) and, if appropriate, (c), (d) and/or (e) customarily used in production of TPUs are described by way of example below:

a) As organic isocyanates (a), it is possible to use generally known aliphatic, cycloaliphatic, araliphatic and/or aromatic isocyanates, preferably diisocyanates, for example trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethylbiphenyl diisocyanate, 1,2-diphenylethane diisocyanate and/or phenylene diisocyanate.

b) As compounds (b) which are reactive toward isocyanates, it is possible to use the generally known compounds which are reactive toward isocyanates, for example, polyesterols, polyetherols and/or polycarbonate diols, which are usually summarized under the term "polyols", and have a molecular weight in the range from 500 to 8000, preferably from 600 to 6000, in particular from 800 to 4000, and preferably have a mean functionality of from 1.8 to 2.3, preferably from 1.9 to 2.2, in particular. Preference is given to using polyether polyols, particularly preferably polyetherols based on polyoxytetramethylene glycol. The polyetherols have the advantage that they have a greater hydrolysis stability than polyesterols.

c) As chain extenders (c), it is possible to use generally known aliphatic, araliphatic, aromatic and/or cycloaliphatic compounds having a molecular weight of from 50 to 499, preferably 2-functional compounds, for example diamines and/or alkanediols having from 2 to 10 carbon atoms in the alkylene radical, in particular 1,4-butanediol, 1,6-hexanediol and/or dialkylene, trialkylene, tetraalkylene, pentaalkylene, hexaalkylene, heptaalkylene, octaalkylene, nonaalkylene and/or decaalkylene glycols having from 3 to 8 carbon atoms, preferably corresponding oligopropylene and/or polypropylene glycols, with mixtures of the chain extenders also being able to be used.

d) Suitable catalysts which, in particular, accelerate the reaction between the NCO groups of the diisocyanates (a) and the hydroxyl groups of the formative components (b) and (c) are the known and customary tertiary amines such as triethylamine, dimethylcyclohexylamine, N-methylmorpholine, N,N'-dimethylpiperazine, 2-(dimethylaminoethoxy)ethanol, diazabicyclo[2.2.2]octane and the like and also, in particular, organic metal compounds such as titanic esters, iron compounds such as iron(III) acetylacetonate, tin compounds, e.g. tin diacetate, tin dioctoate, tin dilaurate or the dialkyltin salts of aliphatic carboxylic acids, e.g. dibutyltin diacetate, dibutyltin dilaurate or the like. The catalysts are usually used in amounts of from 0.0001 to 0.1 parts by weight per 100 parts by weight of polyhydroxyl compound (b).

e) Apart from catalysts (d), it is also possible to add customary auxiliaries (e) to the formative components (a) to (c). Mention may be made by way of example of surface-active substances, fillers, flame retardants, nucleating agents, oxidation stabilizers, lubricants and mold release agents, dyes and pigments, stabilizers, e.g. against hydrolysis, light, heat or discoloration, inorganic and/or organic fillers, reinforcing materials and plasticizers. As hydrolysis inhibitors, preference is given to using oligomeric and/or polymeric aliphatic or aromatic carbodiimides.

Further details regarding the abovementioned auxiliaries and additives may be found in the specialist literature, e.g. in Plastics Additive Handbook, 5$^{th}$ edition, H. Zweifel, ed, Hanser Publishers, Munich, 2001. All molecular weights given in the present text have the unit [g/mol]. To adjust the hardness of the TPUs, the molar ratio of the formative components (b) and (c) can be varied within a relatively wide range. Molar ratios of component (b) to all chain extenders (c) used of from 10:1 to 1:10, in particular from 1:1 to 1:4, have been found to be useful, with the hardness of the TPUs increasing with increasing content of (c). The reaction can be carried out at customary indexes, preferably at an index of from 60 to 120, particularly preferably at an index of from 80 to 110. The index is defined by the ratio of all of the isocyanate groups of component (a) which are used in the reaction to the groups which are reactive toward isocyanates, i.e. the active hydrogens, of the components (b) and (c). At an index of 100, there is one active hydrogen atom, i.e. a function which is reactive toward isocyanates, of the components (b) and (c) present per isocyanate group of the component (a). At indexes above 100, more isocyanate groups than OH groups are present. The TPUs can be produced by the known processes, either continuously, for example using reaction extruders or the belt process, by the one-shot process or the prepolymer process, or batchwise by the known prepolymer process. In these processes, the components (a), (b) and, if appropriate, (c), (d) and/or (e) to be reacted can be mixed with one another in succession or simultaneously, resulting in the reaction commencing immediately. In extruder processes, the formative components (a), (b) and, if appropriate, (c), (d) and/or (e) are introduced either individually or as a mixture into the extruder, reacted at, for example, temperatures of from 100 to 280° C., preferably from 140 to 250° C., and the TPU obtained is extruded, cooled, and pelletized or cooled during pelletization.

TPUs as described in WO 03/014179 can particularly preferably be used for the reaction according to the invention, i.e. with the prepolymer. The statements made below through to the examples relate to these particularly preferred TPUs. These particularly preferred TPUs are preferably obtainable by reaction of (a) isocyanates with (b1) polyester diols having a melting point above 150° C., (b2) polyether diols and/or polyester diols having, in each case, a melting point below 150° C. and a molecular weight of from 501 to 8000 g/mol and, if appropriate, (c) diols having a molecular weight of from 62 g/mol to 500 g/mol. Particular preference is given to thermoplastic polyurethanes in which the molar ratio of the diols (c) having a molecular weight of from 62 g/mol to 500 g/mol to the component (b2) is less than 0.2, particularly preferably from 0.1 to 0.01.

In the present text, the expression "melting point" in the context of the particularly preferred TPUs refers to the maximum of the melting peak in a heating curve measured using a commercial DSC instrument (e.g. DSC 7 from Perkin-Elmer).

The molecular weights indicated in the present text are the number average molecular weights in [g/mol].

These particularly preferred thermoplastic polyurethanes can preferably be produced by reacting a preferably high molecular weight, preferably partially crystalline, thermoplastic polyester with a diol (c) and subsequently reacting the reaction product from (i) comprising (b1) polyester diol having a melting point above 150° C. and, if appropriate, (c) diol together with (b2) polyether diols and/or polyester diols having, in each case, a melting point below 150° C. and a molecular weight of from 501 to 8000 g/mol and also, if appropriate, further (c) diols having a molecular weight of from 62 to 500 g/mol with (a) isocyanate, if appropriate in the presence of (d) catalysts and/or (e) auxiliaries.

In the reaction (ii), the molar ratio of the diols (c) having a molecular weight of from 62 g/mol to 500 g/mol to the component (b2) is preferably less than 0.2, more preferably from 0.1 to 0.01.

While the hard phases are provided for the end product in step (i) by means of the polyester used in step (i), the use of the component (b2) in step (ii) leads to formation of the soft phases. The preferred technical teaching is that polyesters having a pronounced, readily crystallizing hard phase structure are preferably melted in a reaction extruder and firstly degraded to shorter polyesters having free hydroxyl end groups by means of a low molecular weight diol. Here, the original high crystallization tendency of the polyester is retained and can subsequently be utilized, in a rapid reaction, to obtain TPUs having the advantageous properties, e.g. high tensile strengths, low abrasion values and, owing to the high and narrow melting range, high heat distortion resistances and low compression sets. Thus, high molecular weight, partially crystalline, thermoplastic polyesters are, in the preferred process, preferably degraded by means of low molecular weight diols (c) under suitable conditions in a short reaction time to rapidly crystallizing polyester diols (b1) which are in turn incorporated into high molecular weight polymer chains together with other polyester diols and/or polyether diols and diiisocyanates.

The thermoplastic polyester used, i.e. before the reaction (i) with the diol (c), preferably has a molecular weight of from 15 000 g/mol to 40 000 g/mol and preferably has a melting point above 160° C., particularly preferably from 170° C. to 260° C.

As starting material, i.e. as polyester which is reacted in step (i), preferably in the molten state, with the diol(s) (c), particularly preferably at a temperature of from 230° C. to 280° C. and preferably for a time of from 0.1 min to 4 min, particularly preferably from 0.3 min to 1 min, it is possible to use generally known, preferably high molecular weight, preferably partially crystalline, thermoplastic polyesters, for example in pelletized form. Suitable polyesters are based, for example, on aliphatic, cycloaliphatic, araliphatic and/or aromatic dicarboxylic acids, for example lactic acid and/or terephthalic acid, and aliphatic, cycloaliphatic, araliphatic and/or aromatic dialcohols, for example 1,2-ethanediol, 1,4-butanediol and/or 1,6-hexanediol.

Particularly preferred polyesters are: poly-L-lactic acid and/or polyalkylene terephthalate, for example polyethylene terephthalate, polypropylene terephthalate, polybutylene terephthalate, in particular polybutylene terephthalate.

The preparation of these esters from the starting materials mentioned is generally known to those skilled in the art and has been described many times. Suitable polyesters are also commercially available.

The thermoplastic polyester is preferably melted at a temperature of from 180° C. to 270° C. The reaction (i) with the diol (c) is preferably carried out at a temperature of from 230° C. to 280° C., preferably from 240° C. to 280° C.

As diol (c) in step (i) for reaction with the thermoplastic polyester and, if appropriate, in step (ii), it is possible to use generally known diols having a molecular weight of from 62 to 500 g/mol, for example those mentioned at a later point, e.g. ethylene glycol, 1,3-propanediol, 1,4-butanediol, 1,5-pentanediol, 1,6-hexanediol, heptanediol, octanediol, preferably 1,4-butanediol and/or 1,2-ethanediol.

The weight ratio of thermoplastic polyester to diol (c) in step (i) is usually from 100:1 to 100:10, preferably from 100:1.5 to 100:8.

The reaction of the thermoplastic polyester with the diol (c) in reaction step (i) is preferably carried out in the presence of customary catalysts, for example those described at a later point. Preference is given to using catalysts based on metals for this reaction. The reaction in step (i) is preferably carried out in the presence of from 0.1 to 2% by weight of catalysts, based on the weight of the diol (c). The reaction in the presence of such catalysts is advantageous in order to be able to carry out the reaction in the short residence time which is available in the reactor, for example a reaction extruder.

Possible catalysts for this reaction step (i) are, for example: tetrabutyl orthotitanate and/or tin(II) dioctoate, preferably tin dioctoate.

The polyester diol (b1) as reaction product from (i) preferably has a molecular weight of from 1000 g/mol to 5000 g/mol. The melting point of the polyester diol as reaction product from (i) is preferably from 150° C. to 260° C., in particular from 165° C. to 245° C., i.e. the reaction product of the thermoplastic polyester with the diol (c) in step (i) comprises compounds having the melting point mentioned, which are used in the subsequent step (ii).

As a result of the reaction of the thermoplastic polyester with the diol (c) in step (i), the polymer chain of the polyester is cleaved by transesterification with the diol (c). The reaction product of the TPU therefore has free terminal hydroxyl groups and is preferably processed further in the further step (ii) to the actual product, the TPU.

The reaction of the reaction product from step (i) in step (ii) is preferably brought about by addition of (a) isocyanate and (b2) polyether diols and/or polyester diols having, in each case, a melting point below 150° C. and a molecular weight of from 501 to 8000 g/mol and, if appropriate, further diols (c) having a molecular weight of from 62 to 500, (d) catalysts and/or (e) auxiliaries to the reaction product from (i). The reaction of the reaction product with the isocyanate occurs via the terminal hydroxyl groups formed in step (i). The reaction in step (ii) is preferably carried out at a temperature of from 190° C. to 250° C., preferably for a time of from 0.5 to 5 min, particularly preferably from 0.5 to 2 min, preferably in a reaction extruder, particularly preferably the same reaction extruder in which step (i) has also been carried out. For example, the reaction of step (i) can be carried out in the first barrel sections of a customary reaction extruder and the corresponding reaction of step (ii) can be carried out at a later point, i.e. in later barrel sections, after addition of the components (a) and (b2). For example, the first 30 to 50% of the length of the reaction extruder can be used for step (i) and the remaining 50 to 70% can be used for step (ii).

The reaction in step (ii) is preferably carried out using an excess of isocyanate groups over the groups which are reactive toward isocyanates. The ratio of the isocyanate groups to the hydroxyl groups in the reaction (ii) is preferably from 1:1 to 1.2:1, particularly preferably from 1.02:1 to 1.2:1.

The reactions (i) and (ii) are preferably carried out in a generally known reaction extruder. Such reaction extruders are described, for example, in the company literature of Werner & Pfleiderer or in DE-A 2 302 564.

The preferred process is preferably carried out by feeding at least one thermoplastic polyester, e.g. polybutyleneterephthalate, into the first barrel section of a reaction extruder and melting it at temperatures of preferably from 180° C. to 270° C., more preferably from 240° C. to 270° C., and adding a diol (c), e.g. butanediol, and preferably a transesterification catalyst in a subsequent barrel section, degrading the polyester by means of the diol (c) to polyester oligomers having terminal hydroxyl groups and molecular weights of from 1000 to 5000 g/mol at temperatures of from 240° C. to 280° C., introducing isocyanate (a) and (b2) compounds which are reactive toward isocyanates and have a molecular weight of from 501 to 8000 g/mol and, if appropriate, (c) diols having a molecular weight of from 62 to 500, (d) catalysts and/or (e) auxiliaries in a downstream barrel section and subsequently carrying out the formation of the preferred thermoplastic polyurethanes at temperatures of from 190° C. to 250° C.

In step (ii), preference is given to not feeding in any (c) diols having a molecular weight of from 62 to 500 with the exception of the (c) diols having a molecular weight of from 62 to 500 comprised in the reaction product from (i).

In the region in which the thermoplastic polyester is melted, the reaction extruder preferably has neutral and/or backward-transporting kneading blocks and backward-transporting elements and in the region in which the thermoplastic polyester is reacted with the diol preferably has screw mixing elements, toothed discs and/or toothed mixing elements in combination with backward-transporting elements.

After the reaction extruder, the clear melt is usually fed by means of a gear pump to an underwater pelletization unit and pelletized.

The particularly preferred thermoplastic polyurethanes give optically clear, single-phase melts which solidify quickly and, as a result of the partially crystalline polyester hard phase, form slightly opaque to white and totally opaque moldings. The rapid solidification behavior is an important advantage over known formulations and production processes for thermoplastic polyurethanes. The rapid solidification behavior is so pronounced that even products having hardnesses of from 50 to 60 Shore A can be processed by injection molding with cycle times of less than 35 s. In extrusion too, e.g. in blown film production, no problems typical of TPUs, e.g. sticking or blocking of the films or tubes, occur.

The proportion of thermoplastic polyester in the end product, i.e. the thermoplastic polyurethane, is preferably from 5 to 75% by weight. The preferred thermoplastic polyurethanes are particularly preferably products of the reaction of a mixture comprising from 10 to 70% by weight of the reaction product from (i), from 10 to 80% by weight of (b2) and from 10 to 20% by weight of (a), with the percentages being based on the total weight of the mixture comprising (a), (b2), (d), (e) and the reaction product from (i).

EXAMPLE

In a Krauss-Maffei injection molding apparatus the TPU Elastollan® C 65 A 15 HPM (Elastogran GmbH) was mixed with 18% of a prepolymer mixture comprising the following components
Elastollan® PLP 9206 55% (soft phase prepolymer)
Elastollan® PLP 9290 20% (isocyanate prepolymer having a high isocyanate content)
Basonat® HI 100 (HDI triisocyanate, BASF Aktiengesellschaft) 25%
at a temperature of 195° C. and processed to produce box-shaped test specimens. After heat treatment at a temperature of 80° C. for 20 hours, the products had the following properties
1) compression set 72 h/23° C. of 10% compared to 18% in the case of uncrosslinked product (DIN ISO 815)
2) compression set 24 h/70° C. of 20% compared to 30% in the case of uncrosslinked product (DIN ISO 815)
3) the crosslinked product is 98% insoluble in a phenol/chlorobenzene mixture, while the uncrosslinked product was completely soluble
4) increase in hardness from 68 Shore A in the case of uncrosslinked C 65 A 15 HPM to 70 Shore A in the case of the abovementioned mixture. In the case of a comparative formulation without soft phase prepolymer, the hardness increased to 77 Shore A (DIN 53505)

The invention claimed is:

1. A process for producing a crosslinked polyurethane comprising reacting a thermoplastic polyurethane with a prepolymer component comprising at least one prepolymer having isocyanate groups and comprising a reaction product of (a) an isocyanate with (b) a compound which is reactive toward the isocyanate and has a molecular weight in the range from 500 g/mol to 10 000 g/mol, and the prepolymer has a glass transition temperature Tg measured by means of DSC in accordance with DIN EN ISO 11357-1 below −−35° C., wherein the prepolymer has an NCO content of from 1.5 to 6%.

2. The process according to claim 1, wherein the compound which is reactive toward the isocyanate comprises a polyester diol having a molecular weight in the range from 500 to 8000 g/mol.

3. The process according to claim 2, wherein the polyester diol comprises a branched diol.

4. The process according to claim 3, wherein the polyester diol comprises 3-methyl-1,5-pentanediol.

5. The process according to claim 2, wherein the polyester diol comprises at least two different diols.

6. The process according to claim 2, wherein the polyester diol comprises adipic acid.

7. The process according to claim 1, wherein the prepolymer component is a mixture which has an NCO content in the range from 4 to 17%.

8. The process according to claim 1, wherein the prepolymer bonds covalently to the thermoplastic polyurethane as a result of the reaction with the thermoplastic polyurethane.

9. The process according to claim 1, wherein the prepolymer component is a mixture which comprises: (per 100 parts by weight of thermoplastic polyurethane)
   from 5 to 20 parts by weight of said prepolymer, wherein said (b) compound which is reactive toward the isocyanate has a molecular weight in the range from 500 g/mol to 8000 g/mol;
   from 1 to 10 parts by weight of a first additional prepolymer having isocyanate groups which is the reaction product of (a) a diisocyanate and (c) a diol having a molecular weight in the range from 62 g/mol to 499 g/mol; and
   from 1 to 15 parts by weight of a second additional prepolymer, which is a trifunctional prepolymer having three isocyanate groups per molecule, which is the reaction product of (a) a triisocyanate and a diol,
   wherein the second additional prepolymer is different from both the prepolymer and the first additional prepolymer.

10. The process according to claim 1, wherein the thermoplastic polyurethane has a Shore A hardness in the range from 55 to 85.

11. The process according to claim 1, wherein the thermoplastic polyurethane has a Shore A hardness in the range from 60 to 80.

12. The process according to claim 1, wherein the thermoplastic polyurethane is processed with the prepolymer component by injection molding.

13. The process according to claim 12, comprising injecting, in multicomponent injection molding, the thermoplastic polyurethane together with prepolymer component onto a plastic.

14. The process according to claim 13, wherein the plastic onto which the thermoplastic polyurethane in admixture with the prepolymer component is injected is polyamide.

15. The process according to claim 14, wherein the polyamide is reinforced with glass fibers.

16. A polyisocyanate polyaddition product obtained by a process according to claim 1.

17. A crosslinked polyurethane which has a Shore A hardness in the range from 60 to 80 obtained by a process according to claim 1.

* * * * *